Aug. 28, 1956
J. LAZO
2,761,056
INSTRUMENT ILLUMINATING MEANS
Filed Feb. 13, 1953
2 Sheets-Sheet 1
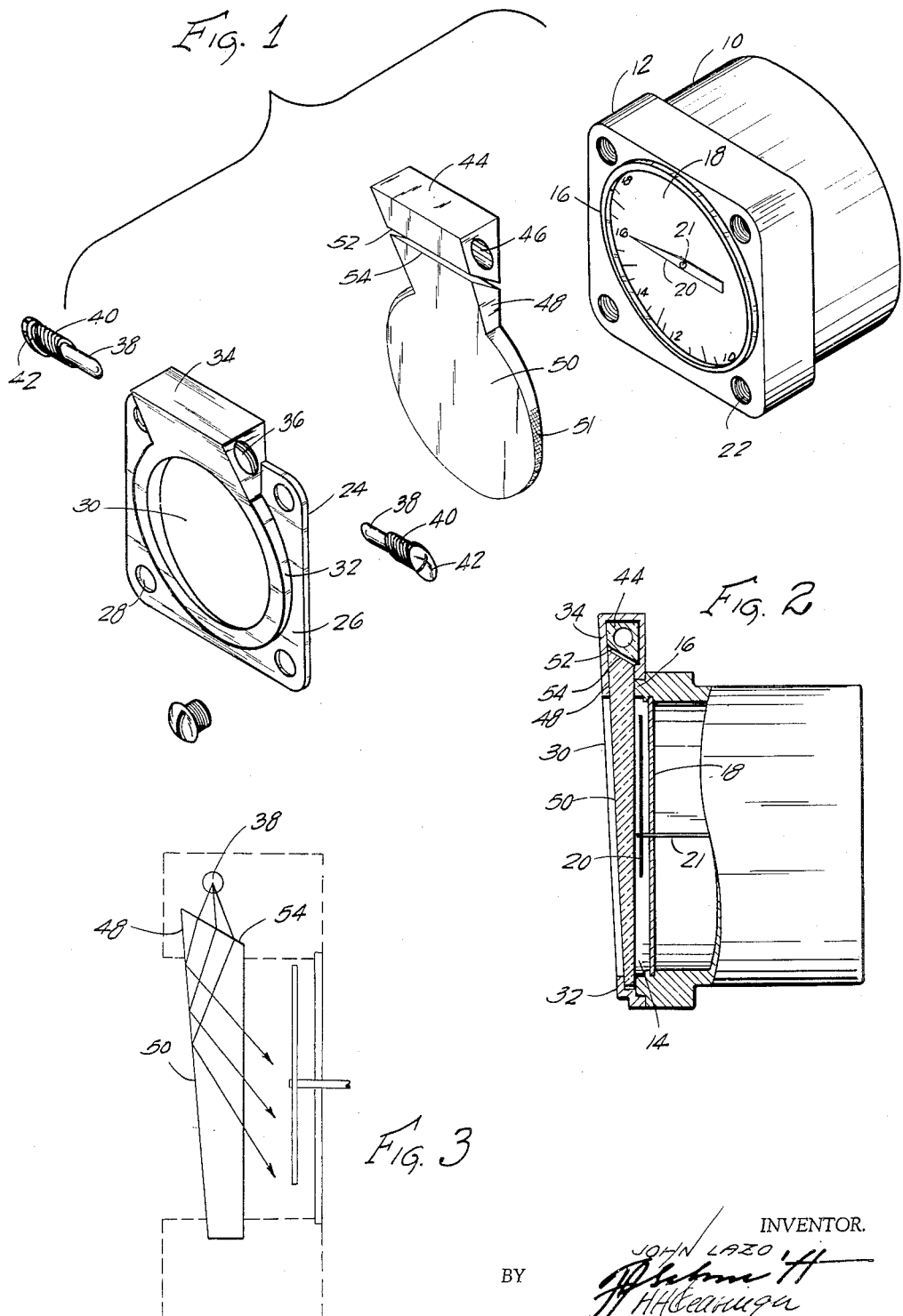

Aug. 28, 1956  J. LAZO  2,761,056
INSTRUMENT ILLUMINATING MEANS
Filed Feb. 13, 1953  2 Sheets-Sheet 2
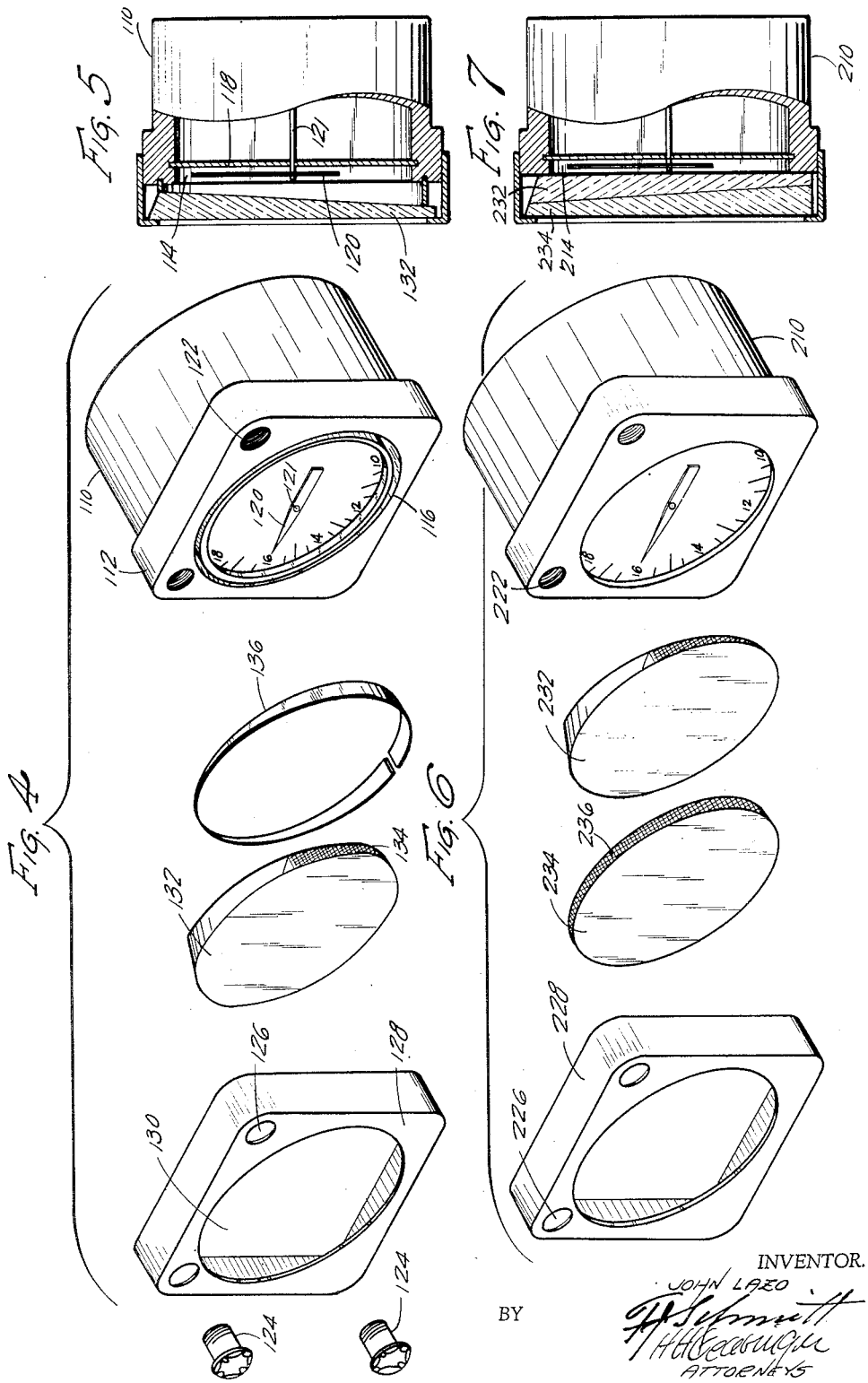
INVENTOR.
JOHN LAZO
BY
ATTORNEYS United States Patent Office 2,761,056
Patented Aug. 28, 1956

2,761,056

INSTRUMENT ILLUMINATING MEANS

John Lazo, Collingswood, N. J.

Application February 13, 1953, Serial No. 336,897

5 Claims. (Cl. 240—2.1)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in instrument panel lighting and more particularly relates to the provision of illuminating means for an instrument panel wherein glare is eliminated.

The problem of instrument panel lighting is an increasingly important one especially in the field of aeronautics where the instrument panel usually presents a maze of different dials and indicators which must be accessible at all times to the instantaneous view of the pilot. This problem has grown ever more acute with the increasing necessity of night flying both for military and civilian aircraft.

Heretofore, various attempts were made to provide suitable lighting means among which were devices embodying such methods as incandescent floodlighting, fluorescent lighting and indirect "piped" lighting.

The method of incandescent floodlighting involves the location of light sources at some distance from the instrument or attaching them to the instrument so that light is directed at the face of the instrument thereby illuminating the dial face. This type of lighting, however, gives high overall brightness levels resulting from lack of confinement of the illumination to the dial face. In situations requiring dark adaptation, such as in night flying aircraft, these brightness levels can be deleterious to vision. Furthermore, this method results in the accumulation of shadows in some areas which should have been illuminated. Other disadvantages inherent in this system are the random specular reflections causing glare, the difficulty in achieving even illumination over single instruments or banks of instruments, the direct beaming of light rays into the observer's eyes, and the relative inability to select the specific instruments to be illuminated at any one time.

The fluorescent system is essentially the same as the incandescent floodlighting system except that ultra-violet instead of incandescent light is directed to the dial face from the light sources. This ultra-violet light activates phosphor compounded markings which absorb the ultra-violet energy and emit visible light. This system has some of the same deficiencies as the incandescent system and, in addition, does not provide sufficient brightness control, does not have proper light spectral qualities for specific applications to provide for visual efficiency and comfort for long viewing periods, and may promote illusions of movement of the dial markings.

The indirect "piped" lighting system applies to many lighting techniques, the common feature of which is the direction of the light to the object by means other than head-on floodlighting. There are many variations of this system. In some cases, a ring made of a light-conducting material, such as glass or plastic, is placed around the instrument face either outside of the instrument or between the dial face and the cover glass. Light is directed into the light-conducting medium by appropriately placed light sources. This light is then piped through the medium by internal reflections to emerge as a ring of directed light over the dial face.

In other cases, the dial face and/or pointer elements are made of light-conducting material. The dial face has translucent letters, numbers and other markings. Light conducted through these markings from appropriately placed light sources emerges through the translucent portions providing a contrast relationship over the dial face.

In the ring method, the observer is often exposed to direct light from the ring. Further, due to the shallow angle of light distribution, the instrument is not evenly illuminated. As regards the light transmitting dial faces and/or pointers, it is difficult to obtain even illumination for any particular installation. In some instruments where more than one dial face or pointer are employed and where the several faces or pointers are at different levels from each other, this lighting method can not be affected.

In addition to the methods outlined above, another method of instrument panel lighting has sometimes been used. This involves the provision of a lens adjacent to but spaced from the dial face with the convex face of the lens facing the dial face. A light source is embedded in the lens laterally of that portion of the lens which faces the dial and light rays from this source enter the space between the lens and the dial face, are reflected against the convex lens surface and are reflected thereby against the dial face. The inherent disadvantages of this method are the formation of bright spots around the edge of the curved lens due to a greater intensity of the light in this area caused by the light rays being emitted laterally into the space between the lens and the dial face at various angles of incidence relative to the dial face. Some of these rays are emitted directly onto the dial face causing the bright spots. Furthermore, since this method involves the use of surface reflections from the curved lens surface, in order to obtain a good distribution of light, the lens surface must be very accurately curved since any deviation from the normal curve results in distortion of the image of the dial face. In addition, the rays which enter the lens itself are frequently refracted from the surface of the lens opposite to the curved surface onto the curved surface and then reflected back from that surface in all directions resulting in a great amount of undesirable glare.

It is, therefore, one object of this invention to provide an indirect illumination technique which provides a uniform distribution of light over the entire area of a dial face.

Another object of this invention is to provide an illumination device for instrument panels or the like wherein the requirements of an ideal instrument lighting method including simulated daylight conditions are satisfied and wherein there are no specular reflections and shadows present.

Another object of this invention is to provide an illumination device for instrument panels or the like wherein there is complete selectivity of instruments to be illuminated.

Another object of this invention is to provide a compact, integrally designed lighting device for instrument panels or the like which is light in weight, simple of construction and inexpensive to make.

Other objects and many of the attendant advantages of this invention will be readily appreciated as the same becomes better understood by reference to the following detailed description when considered in connection with the accompanying drawings wherein:

Fig. 1 is an exploded view of one embodiment of the invention.

Fig. 2 is a cross-sectional view of the device shown in Fig. 1 when assembled.

Fig. 3 is a schematic view illustrating the action of the prism on the light rays.

Fig. 4 is an exploded view of a second embodiment of the invention.

Fig. 5 is a cross-sectional view of the device shown in Fig. 4 when assembled.

Fig. 6 is an exploded view of a third embodiment of the invention.

Fig. 7 is a cross-sectional view of the device shown in Fig. 6 when assembled.

This invention provides a means for illuminating an instrument panel with the elimination of substantially all glare by using the method of "internal lighting." This "internal lighting" involves the provision of a transparent cover glass (which may be actually constructed of glass, plastic or other suitable material) which takes the form of a cross-sectionally wedge-shaped prism. Light rays coming from a source outside the prism enter the prism laterally and are refracted against one of the inner surfaces of the prism and reflected therefrom onto the dial face. In this manner, very few of the light rays are permitted to leave the prism in the direction of the observer but are, instead, directed onto the dial face. As a consequence, there is practically no glare resulting from the use of this method of instrument lighting.

Referring now in greater detail to the drawings wherein similar reference characters refer to similar parts, there is shown an instrument 10 having a front portion 12 thereon. The portion 12 is provided with a circular opening 14 bounded by a flange 16. Within the opening 14 is provided a dial face 18 adjacent which is set a pointer 20 on a shaft 21. A plurality of internally threaded openings 22 are provided in the portion 12 to receive appropriate screws for holding the front cover 24 on the instrument.

The cover 24 comprises a flat plate 26 having a plurality of openings 28 corresponding to openings 22 in the front portion 12 for the purpose of receiving the holding screws therein. A circular opening 30 is formed in the plate 26, this opening 30 having a diameter corresponding to the diameter of the dial face 18. Surrounding the opening 30 is an outwardly extending hollow embossment 32 forming a channel which is adapted to encompass the flange 16 on the portion 12 when the cover is fastened to the instrument. The embossment 32 is, further, provided with a hollow extension 34, this portion 34 extending beyond the edge of the plate 26. The embossment 32 is formed wide at the top and tapers to a narrower contour at the bottom so that when viewed from the side it appears wedge-shaped. The extension 34 is also wedge-shaped, being of the same width at its bottom end as that portion of the embossment 32 to which it connects and tapering outwardly toward its top end. The embossment 32 and its extension 34, thereby, form a frame the width of which tapers from a relatively wide top to a relatively narrow bottom as best illustrated in Fig. 2.

A pair of oppositely positioned screw-threaded openings 36 are formed in the extension 34, one on each side thereof, each of these openings being adapted to receive therein a light bulb 38 having a screw-threaded base 40 and a head 42.

Each of the bulbs 38 is also adapted to extend into a transparent housing 44 which is formed to fit within the upper end of the hollow extension 34, the housing 44 being provided with a pair of oppositely positioned openings 46 corresponding to the openings 36 and adapted to receive the bulbs 38.

The extension 34 is also constructed to hold a tongue 48 of a circular prism 50, the tongue 48 being adapted to occupy the lower portion of the extension. The prism, itself, is adapted to fit into the frame formed by the hollow embossment 32, the shape of the prism corresponding to that of the frame. The lower edge of the prism is coated black as at 51.

When assembled, the prism 50, its tongue 48 and the housing 44 are held in position in front of the dial face by the clamping action of the cover 24, the prism being held spaced from the dial face by the annular flange 16, as best shown in Fig. 2. It should, further, be noted that the housing 44 is spaced vertically from the top of tongue 48 of the prism 50 when in assembled position and that the lower edge 52 of the housing is slanted in a complementary direction to the top edge 54 of the tongue 48.

Referring to Fig. 3, light rays emanating spherically from the light source 38 will be refracted upon entering the slanting edge 54 of the tongue 48. The angle of light refraction will depend upon the angle of incidence and upon the indices of refraction of the material from which the prism is constructed and of the air between the edges 52 and 54, as can be seen by rewriting Snell's law:

$$\text{Sin } r = \frac{n}{n^1} \sin i$$

where $n$ and $n^1$ are respectively the indices of refraction for air and for glass, plastic or whatever other material the prism is made of, where $r$ is the refracting angle, and where $i$ is the incident ray angle.

As the angle of incidence of the light ray increases the angle of refraction will also increase. The apex angle of the prismatic cover glass 50 may be calculated so that for a specific desired illumination area, most of the refracted rays will strike the interior surface of the outer or front side of the light transmitting medium 50 at angles greater than the critical angle and will be reflected internally. Most of these refracted rays will, due to the angle between the front and back surfaces of the medium 50 and the top surface 54, strike the inner or back surface at angles less than the critical angle and will emerge from the light conducting medium upon the dial face. To utilize a greater area of the light transmitting medium for light distributional purposes, the angles of incident light may be varied by either relocation of the light sources with respect to the transmitting medium or by changing the angle of the entrance surface 54 with respect to the light source. These changes can be made to obtain the optimum light distribution for specific dial designs.

A modification of the invention as described above is illustrated in Figs. 4 and 5 wherein there is shown an instrument 110 similar to instrument 10, the instrument 110 having a front portion 112. A circular opening 114 is provided centrally of the portion 112 and this opening is bounded by an annular groove or slot 116. A dial face 118 is provided within the opening 114 and a pointer 120 is mounted adjacent the dial face on a shaft 121.

A pair of threaded openings 122 are provided at opposite corners of the front portion to receive a pair of light bulbs encased in screw-threaded transparent casings 124, these encased light bulbs also extending through openings 126 formed in a cover 128.

The cover 128 is provided with a central opening 130 corresponding to the opening 114 in the instrument, and adapted to be held in place adjacent the face of the instrument by this cover 128 is a circular prism 132 the narrower edge portion of which is blackened as at 134. The prism 132 is spaced from the dial face 118 by a split ring 136 which fits into the slot 116. The ring 136 is formed with a tapering periphery complementary to the prismatic shape of the prism 132 and is black in color so as to prevent the entrance of light rays around the periphery of the prism.

In Figs. 6 and 7 there is illustrated a third form of the invention wherein an instrument 210 similar to that shown at 110 and having a central opening 214 is provided with a cover 228 similar to cover 128, the instrument 210 and cover 228 being respectively provided with openings 222 and 226 to threadedly receive light bulb assemblies similar to those illustrated at 124. The prism 232 is similar to prism 132. Unlike the form shown in Figs. 4 and 5, however, the prism 232 is held against the opening in the instrument, and adjacent the prism 232 in face-to-face relationship therewith is provided a complementary prism 234 the edge of which is blackened as shown at 236 to prevent the entrance of light.

The advantages of using the complementary prisms are many among which is the fact that the top complementary prism 234 prevents the accumulation of dust particles on the lighting prism 232. This not only keeps the lighting prism clean but prevents the glow caused by the reflection of light from the dust particles or from finger marks. The use of the two complementary prisms also provides a transparent body having parallel, annular surfaces, thereby eliminating any foreshortening of the visual presentation caused by the original wedge-like shape of the lighting prism. Another advantage is that the complementary prism tends to prevent light rays reflected from the inner surface of the lighting prism from escaping out from the outer surface. This use of the complementary prism is especially effective when the complementary prism is coated with a transparent light reflection coating such as magnesium fluoride. Generally, enough coating is used to provide a thickness of about one-half a wave-length which results in an effective constructive interference with the light rays, turning the rays back into the prism. This principle of reflection coating may also be used with the single prisms of the first two forms of the invention.

The above described illumination technique is not confined in its use to aircraft instrument panels but may be used in automobiles, trains, radio station control panels, shipboard control stations and similar instrument panels. It may also be used wherever it is important to obtain a non-glare illumination, such as in the lighting of pictures in the home or in an art gallery, for providing illumination for reading programs in darkened theatres, for illuminating maps and charts, or for any one of a variety of similar uses.

Obviously many modifications and variations of the present invention are possible in the light of the above teachings. It is, therefore, to be understood that within the scope of the appended claims the invention may be practiced otherwise than as specifically described.

What is claimed as the invention is:

1. A device for illuminating an object comprising a wedge-shaped light transparent medium having a pair of non-parallel opposed surfaces and an enlarged lateral surface which is oblique to and forms an obtuse angle with one of said opposed surfaces; means for positioning said one opposed surface of the medium substantially parallel to the face of the object to be illuminated; and a light source positioned adjacent the enlarged lateral surface of the medium, the said obtuse angle and the angle between the non-parallel surfaces of the medium being so constructed and designed that energy from the light source passes through the enlarged lateral surface of the medium and meets the other of the said opposed surfaces at an angle greater than the critical angle of the medium and is reflected internally so as to emerge from the said one opposed surface and illuminate the object.

2. A device for illuminating a dial instrument comprising a wedge-shaped prism having a pair of non-parallel opposed surfaces and a transverse lateral peripheral surface, the non-parallel surfaces of the prism extending from one portion of the transverse surface and converging toward another portion of the transverse surface which is reduced in width, the said one portion of the transverse surface being oblique to and forming an obtuse angle with one of said non-parallel surfaces; means for positioning said one non-parallel surface of the prism substantially parallel to the face of the dial instrument to be illuminated; and a light source positioned adjacent the said one portion of the transverse surface of the medium, the said obtuse angle and the angle between the non-parallel surfaces of the prism being so constructed and designed that energy from the light source passes through the said one portion of the transverse surface of the medium and meets the other of the said non-parallel surfaces at an angle greater than the critical angle of the prism and is reflected internally so as to emerge from the said one non-parallel surface and illuminate the dial instrument.

3. The device of claim 2 wherein the said other portion of the transverse surface of the prism is blackened to prevent the exit of light rays therefrom.

4. A device for illuminating an object comprising a first wedge-shaped prism having a pair of non-parallel opposed surfaces and an enlarged transverse lateral surface which is oblique to and forms an obtuse angle with one of said opposed surfaces; means for positioning said one opposed surface of the prism substantially parallel to the face of the object to be illuminated; a light source positioned adjacent the oblique lateral surface of the prism, the said obtuse angle and the angle between the non-parallel surfaces of the prism being so constructed and designed that energy from the light source passes through the enlarged lateral surface of the prism and meets the other of the said opposed surfaces at an angle greater than the critical angle of the prism and is reflected internally so as to emerge from the said one opposed surface and illuminate the object; and a second wedge-shaped prism having a pair of non-parallel opposed surfaces and a transverse lateral surface that extends between the said non-parallel surfaces, one of the non-parallel surfaces of the second prism being positioned contiguous with the said other opposed surface of the first prism so as to provide a transparent dust cover therefor and to prevent a distorted view of the object as viewed through the non-parallel surfaces of the first prism.

5. The device of claim 4 wherein the transverse lateral surface of the second prism is blackened.

References Cited in the file of this patent

UNITED STATES PATENTS

| 1,739,954 | Du Pont | Dec. 17, 1929 |
| 2,202,142 | Carter | May 28, 1940 |
| 2,259,910 | Rylsky | Oct. 21, 1941 |
| 2,347,665 | Christensen et al. | May 2, 1944 |
| 2,646,637 | Nierenberg et al. | July 28, 1953 |

FOREIGN PATENTS

| 884,319 | France | Aug. 10, 1943 |